(12) United States Patent
Rodriguez Bravo et al.

(10) Patent No.: US 12,056,674 B2
(45) Date of Patent: Aug. 6, 2024

(54) SECURITY FOR CONNECTED DEVICES

(71) Applicant: KYNDRYL, INC., New York, NY (US)

(72) Inventors: Cesar Augusto Rodriguez Bravo, Alajuela (CR); David Alonso Campos Batista, Aurora (CR); Desilda Toska, Alajuela (CR); Romelia H Flores, Keller, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/502,240

(22) Filed: Oct. 15, 2021

(65) Prior Publication Data

US 2023/0119117 A1    Apr. 20, 2023

(51) Int. Cl.
*G06Q 20/10* (2012.01)

(52) U.S. Cl.
CPC .................. *G06Q 20/1085* (2013.01)

(58) Field of Classification Search
CPC ................................. G06Q 20/1085
USPC .......................................... 705/43
See application file for complete search history.

(56) References Cited

U.S. PATENT DOCUMENTS

| | | | |
|---|---|---|---|
| 7,946,480 B2 | 5/2011 | Miller et al. | |
| 10,430,779 B2 | 10/2019 | Iqbal et al. | |
| 10,992,679 B1* | 4/2021 | Fakhraie | H04L 63/102 |
| 2004/0044739 A1 | 3/2004 | Ziegler | |
| 2008/0251578 A1 | 10/2008 | Jansing | |
| 2015/0088758 A1 | 3/2015 | Varadarajan et al. | |
| 2016/0019537 A1 | 1/2016 | Raja et al. | |
| 2018/0068297 A1 | 3/2018 | Goodman et al. | |

(Continued)

FOREIGN PATENT DOCUMENTS

| | | |
|---|---|---|
| CN | 1435787 | 8/2003 |
| CN | 101046900 | 10/2007 |
| CN | 101266704 | 11/2010 |

(Continued)

OTHER PUBLICATIONS

Anonymous, "Techniques for deactivating online, mobile, electronic card accounts using a single point system with a safekey", Oct. 7, 2013, 9 pages. (Year: 2013).*

(Continued)

*Primary Examiner* — Ambreen A. Alladin
(74) *Attorney, Agent, or Firm* — Dan Housley; Rupam Bhar; Calderon Safran & Cole P.C.

(57) ABSTRACT

A method includes: receiving, by a computer device and from an automated teller machine, a personal identification number that is associated with an account; determining, by the computer device, that the personal identification number is a disablement personal identification number that is associated with the account, the account having an activation personal identification number, the disablement personal identification number and the activation personal identification number being different; determining, by the computer device and as a result of receiving the disablement personal identification number, at least one disablement action to be performed by a device other than the automated teller machine; and transmitting, by the computer device, a command to perform the disablement action.

19 Claims, 6 Drawing Sheets

(56) References Cited

U.S. PATENT DOCUMENTS

2018/0197181 A1* 7/2018 Kurian .................. G07F 7/1025
2020/0387903 A1* 12/2020 Wright ............... G06Q 20/4012

FOREIGN PATENT DOCUMENTS

| CN | 105006078 | 10/2015 | |
| WO | 2006081593 | 8/2006 | |
| WO | WO-2015099725 A1 * | 7/2015 | ......... G06Q 20/1085 |

OTHER PUBLICATIONS

Hameed, et al. "SafePass: Authentication under Duress for ATM Transactions", Dec. 2013. 2013 2nd National Conference on Information Assurance (NCIA). Published by IEEE, pp. 1-5, DOI: 10.1109/NCIA.2013.6725317 (Year: 2013).*

Mell et al., "The NIST Definition of Cloud Computing", Sep. 2011, 7 pages.

Lynch, "Consumers' Trust of Cardless ATMs Will Not Happen Without Strong Mobile Device Security", Apr. 16, 2018, 8 pages.

Anonymous, "Technique for deactivating online, mobile, electronic card accounts using a single point in system with a safekey", Oct. 7, 2013, 9 pages.

* cited by examiner

SECURITY FOR CONNECTED DEVICES

BACKGROUND

Aspects of the present invention relate generally to security of connected device and, more particularly, to disabling devices associated with an account upon receipt of a disablement code.

Many transactions, including cash withdrawal, are performed at an automated teller machine (ATM). In some cases, a smart phone or smart watch are used to perform these transactions without requiring a debit card or other card.

SUMMARY

In a first aspect of the invention, there is a computer-implemented method including: receiving, by a computer device and from an automated teller machine, a personal identification number that is associated with an account; determining, by the computer device, that the personal identification number is a disablement personal identification number that is associated with the account, the account having an activation personal identification number, the disablement personal identification number and the activation personal identification number being different; determining, by the computer device and as a result of receiving the disablement personal identification number, at least one disablement action to be performed by a device other than the automated teller machine; and transmitting, by the computer device, a command to perform the disablement action.

In another aspect of the invention, there is a computer program product including one or more computer readable storage media having program instructions collectively stored on the one or more computer readable storage media. The program instructions are executable to: receive, from an automated teller machine, a personal identification number that is associated with an account; determine that the personal identification number is a disablement personal identification number that is associated with the account, the account having an activation personal identification number, the disablement personal identification number and the activation personal identification number being different; determine, as a result of receiving the disablement personal identification number, at least one disablement action to be performed by a device other than the automated teller machine; and transmit a command to perform the disablement action.

In another aspect of the invention, there is system including a processor, a computer readable memory, one or more computer readable storage media, and program instructions collectively stored on the one or more computer readable storage media. The program instructions are executable to: receive, from an automated teller machine, a personal identification number that is associated with an account; determine that the personal identification number is a disablement personal identification number that is associated with the account, the account having an activation personal identification number, the disablement personal identification number and the activation personal identification number being different; determine, as a result of receiving the disablement personal identification number, at least one disablement action to be performed by a device other than the automated teller machine; and transmit a command to perform the disablement action.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to security of connected device and, more particularly, to disabling devices associated with an account upon receipt of a disablement code. According to aspects of the invention a security module receives a disablement personal identification number (PIN) from an ATM. In embodiments, the security module determines at least one disablement action to be performed by a device other than the ATM. In this manner, implementations of the invention help prevent the unauthorized use of devices used to access, or in the vicinity of, the ATM.

In embodiments, there is a computer-implemented process for managing security of a connected device, the computer-implemented process including: in response to receiving, from the connected device, a predetermined disablement personal identification number (PIN) associated with a first transaction on a first device and different from a predetermined enablement (PIN), initiating the first transaction on the first device including validating and a determining whether the disablement PIN was used; in response to a determination the disablement PIN was used, requesting a disablement account transaction to identify a set of predetermined commands, stored in a repository, and associated with the disablement PIN; sending the set of predetermined commands identified to a disablement command processor; executing the set of predetermined commands identified, by the disablement command processor connecting with at least one disablement application processing service and at least one alerting service; in response to the at least one disablement application processing service and the at least one alerting service executing the set of predetermined commands identified, receiving results of the disablement account transaction on the first device; and in response to receiving the results of the disablement account transaction on the first device, displaying a predetermined message associated with the first transaction on the first device.

Embodiments of the invention provide improved cardless ATM operation to address the technical problem of unauthorized use of devices used in implementing cardless ATM operation. Implementations of the invention provide new functionality enabling the disablement of devices used in the implementation of cardless ATM operation and/or in the vicinity of carless ATM operation. The technical problem of disabling devices used in implementing cardless ATM operation arises solely in the realm of computer technology and is addressed in embodiments of the invention by sending electronic disablement commands to such devices.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
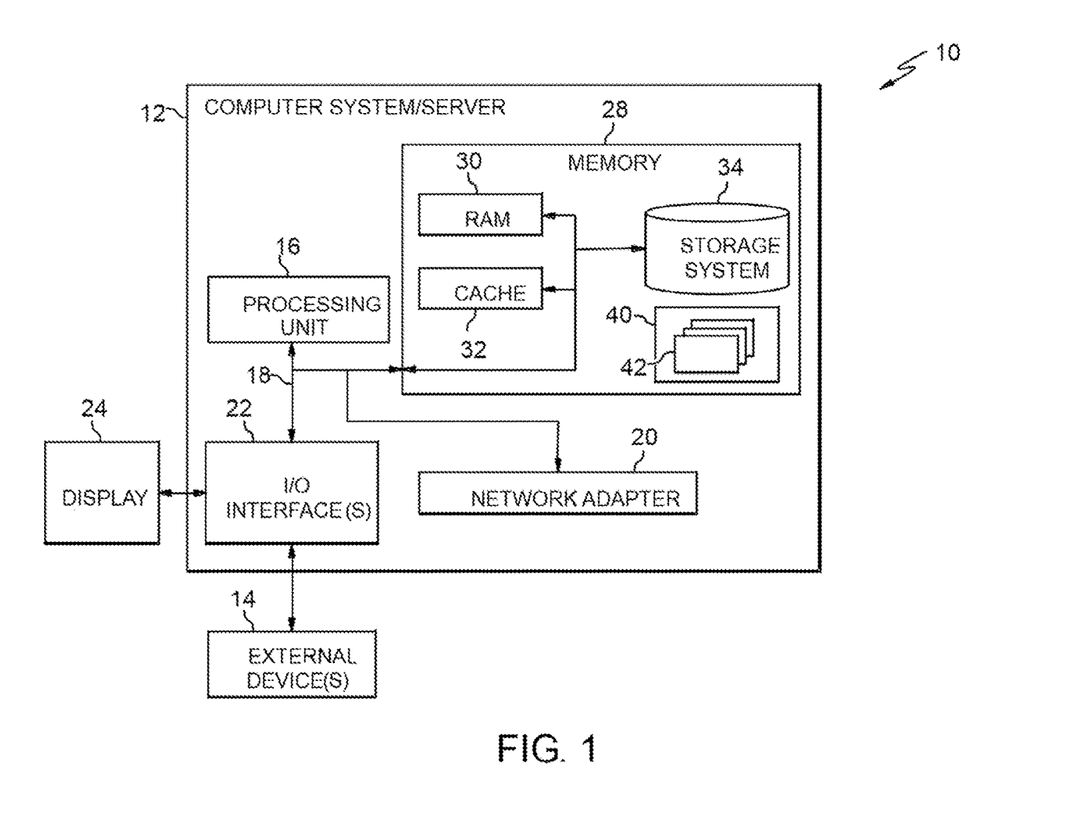
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
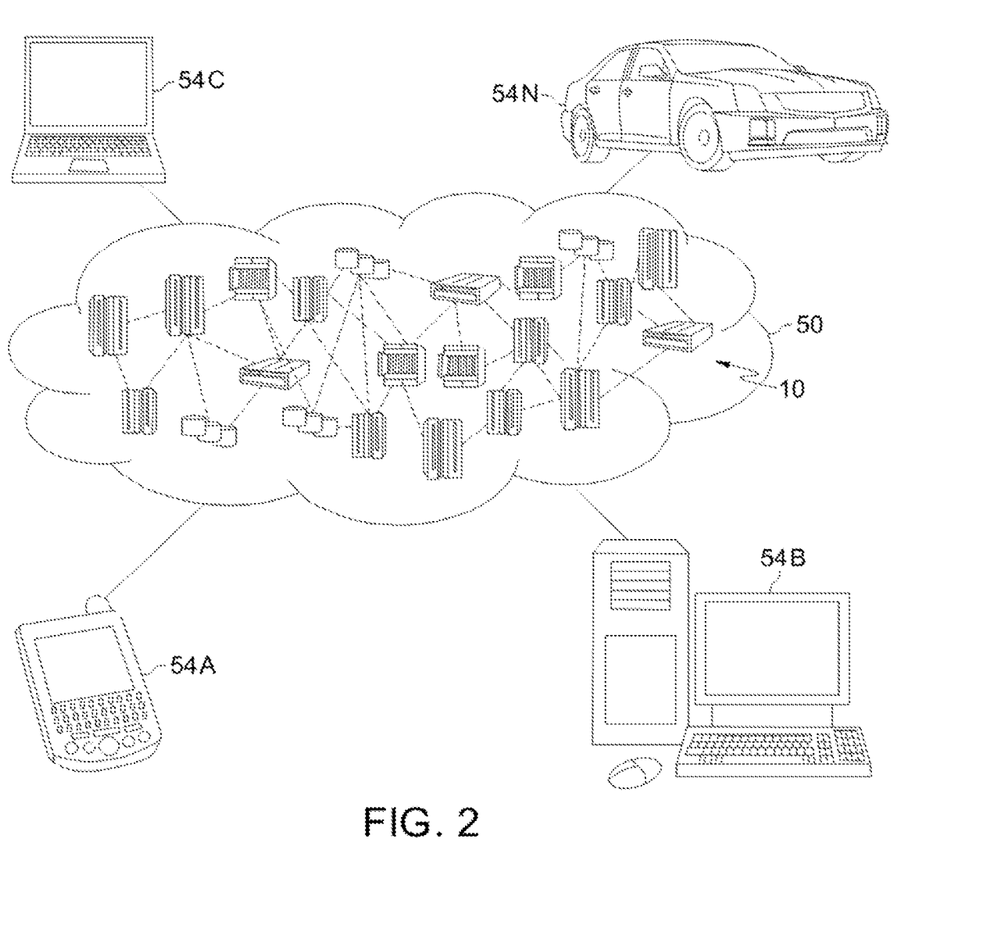
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
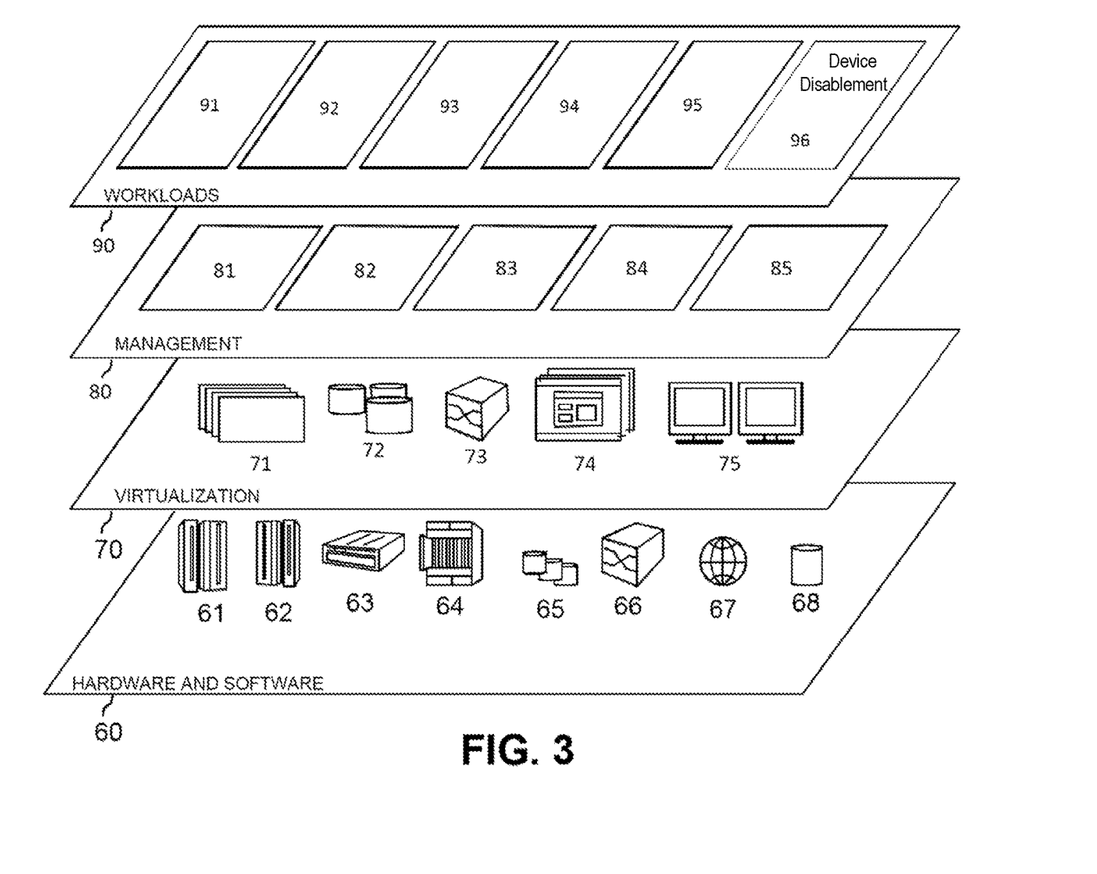
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device disablement 96.

Implementations of the invention may include a computer system/server 12 of FIG. 1 in which one or more of the program modules 42 are configured to perform (or cause the computer system/server 12 to perform) one or more functions of the device disablement 96 of FIG. 3. For example, the one or more of the program modules 42 may be configured to: receive, from an automated teller machine, a personal identification number that is associated with an account; determine that the personal identification number is a disablement personal identification number that is associated with the account, the account having an activation personal identification number, the disablement personal identification number and the activation personal identification number being different; determine, as a result of receiving the disablement personal identification number, at least one disablement action to be performed by a device other than the automated teller machine; and transmit a command to perform the disablement action.

Many financial institutions are innovating with cardless ATM capabilities that allow consumers to withdraw cash using mobile devices instead of plastic cards to authenticate themselves and initiate transactions. In some cases, the procedure to be followed in a cardless ATM transaction is simply: open the mobile application; enter a personal identification number (PIN); select the amount of cash to withdraw; and scan a quick response (QR) code on the ATM screen.

A problem associated with some cardless ATM transactions in that to use a cardless ATM, a user needs to use their smartphone or other smart device. As a result, in a case of an unauthorized user, the unauthorized user is often able to take the smart device as well as the cash withdrawn. Embodiments of the invention disable the smart device as well as other devices to deter theft of the smart device and the other devices.

Embodiments provide an advanced personal security system for Internet of Things (IoT) devices. Embodiments utilize a disablement PIN. A user that has access to an account will have two types of PINs associated with their account: an activation PIN; and a disablement PIN. In a case of a robbery attempt by an unauthorized user at the ATM, the user enters (or gives it to the unauthorized user) the disablement PIN. In response to the system receiving the disablement PIN, the system will execute disablement commands that are applicable to IoT devices and/or other devices associated with the user. An advantage of embodiments is that the system interacts with not only a user's smart phone or other smart device used to access the account through the ATM, but with other devices selected by the user. For example, a user's automobile can be disabled as a result of entry of the disablement PIN.

Figure 4:
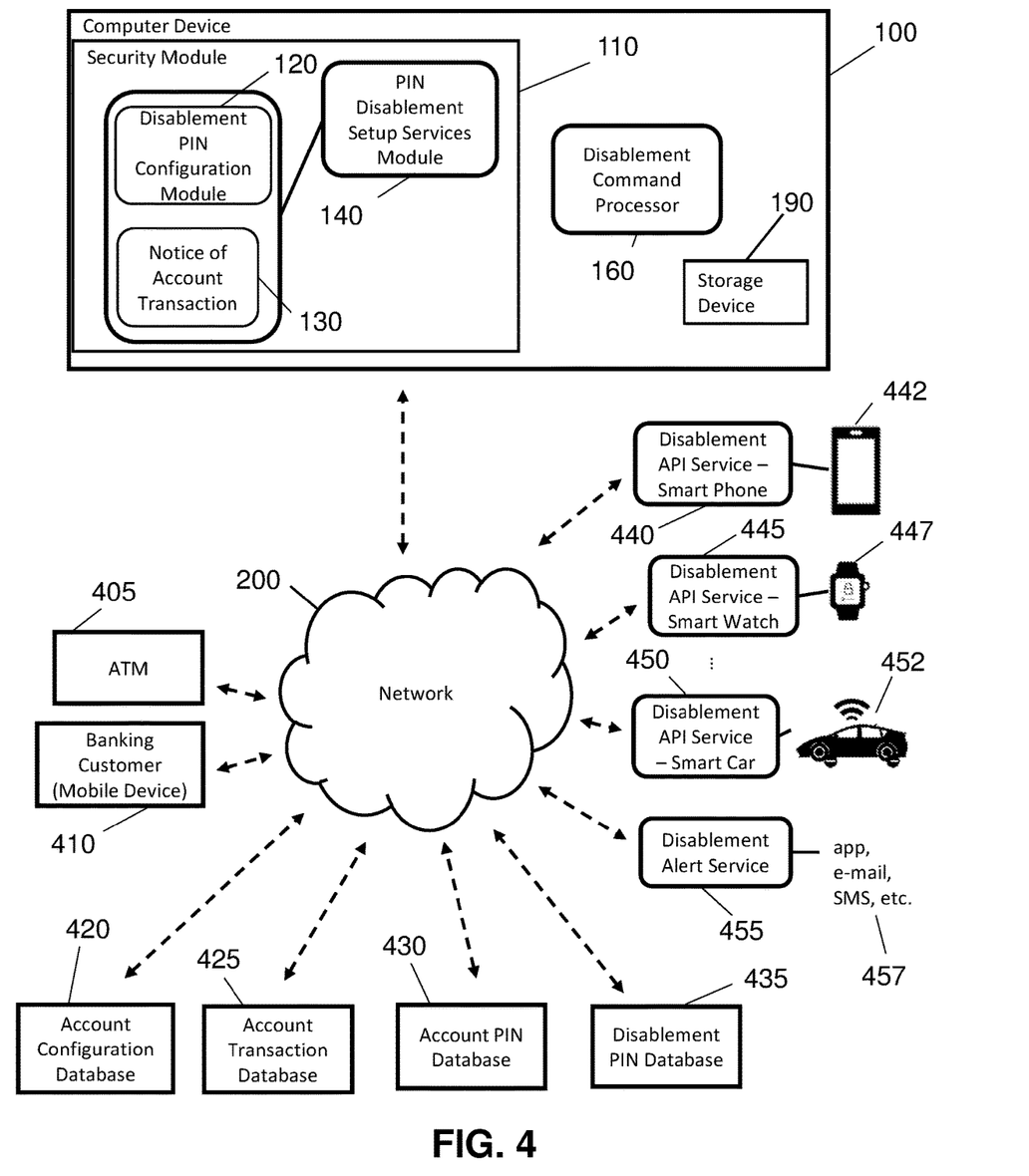
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In this example, computer device 100 includes security module 110 comprising, for example, one or more of program modules 42 in FIG. 1, and a storage device 190 such as, for example, storage system 34 in FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 shows security module 110 including a disablement PIN configuration module 120, for example, one or more of program modules 42 in FIG. 1, which is an application utilized by a user to configure a disablement PIN account. Disablement PIN configuration module 120 interfaces with PIN disablement setup services 140 to allow a user to select what devices are disabled, and what alerts are to be given, as a result of entry of the disablement PIN. In other embodiments, disablement PIN configuration module 120 is separate from security module 110. For example, in embodiments, disablement PIN configuration module 120 is a part of a financial institutions PIN procedure when a user sets up or revises PIN(s) associated with a particular account. Notice of account transaction 130, which is a notice of an account transaction, is received by security module 110 as a trigger for initiation of the processes performed by security module 110. PIN disablement setup services module 140, for example, one or more of program modules 42 in FIG. 1, is utilized by disablement PIN configuration module 120 to associate disablement PINs and commands with existing bank accounts. A disablement command processor 160 directs processing of disablement commands by one or more disablement application programming interface (API) services, and any alerting registered by the user in disablement PIN configuration module 120.

FIG. 4 shows an ATM 405 through which the user requests, for example, a cash withdrawal using a mobile device 410 such as, for example, a smart phone or a smart watch. FIG. 4 shows, in this example, four databases accessed by security module 110. In embodiments, account configuration database 420 contains information regarding the configuration of the user's accounts including, for example, account number, account owner, account co-owner, and authorized users. In embodiments, account transaction database 425 contains information regarding user's accounts including, for example, account number, account balance, and account transaction history. In embodiments, account PIN database 430 contains information regarding the user's account PINs including, for example, account number, account PIN, disablement PIN(s). In embodiments, disablement PIN database 435 contains information regarding the user's disablement PIN(s) including, for example, one or more disablement PINs for one or more of the user's accounts, operation (including disablement) command rules for each disablement PIN, and alert rules for each disablement PIN. In embodiments, one account has multiple disablement PINs, each having different operation command rules and/or alert rules. For example, in an embodiment, a first disablement PIN for account A disables a smart phone, a smart watch, and an automobile, and sends an alert to mobile phone number X. In that same embodiment, a second disablement PIN for account A disables only the automobile, and sends an alert to mobile phone numbers X and Y. Depending on who the particular user is and the particular situation in when the disablement PIN is used, different disablements/alerts are desirable.

In embodiments, the cash withdrawal is permitted to proceed even though a disablement PIN is entered into ATM 405 by the user. In embodiments, this is desirable to delay alerting the unauthorized user of the disablement of smart phone 442 and/or other devices by allowing the ATM to distribute the cash.

In FIG. 4, four examples of disablement services enacted by security module 110 are shown. In embodiments, security module 110 determines what disablement services to enact by checking the information in disablement PIN database 435, as described above. In embodiments, disablement API service—smart phone 440 receives a command from disablement command processor 160 to disable smart phone 442. In embodiments, smart phone 442 is the mobile device 410 shown in FIG. 4. For example, a user uses mobile device 410 to access a bank account through ATM 405. However, in embodiments, smart phone 442 is a smart phone other than mobile device 410. For example, smart phone 442 is a smart phone used by a family member of the user of mobile device 410 who with the user of mobile device 410 when the user accesses a bank account through ATM 405. In embodiments, it is desirable to disable the family member's smart phone so that it will be of no use to an unauthorized user who may be inclined to take smart phone 442. In embodiments, disablement API service—smart watch 445 receives a command from disablement command processor 160 to disable smart watch 447. In embodiments, disablement API service—smart car 450 receives a command from disablement command processor 160 to disable smart car 452. In embodiments, disablement alert service 455 receives a command from disablement command processor 160 to display and/or sound an audible alert 457 by email, short message service (SMS), and/or some other alert method. In embodiments, the alert is sent to electronic devices possessed by people who should be alerted to the event causing the entry of the disablement PIN. In embodiments, if it is desirable, the alert is sent to one or more of smart phone 442, smart watch 447, smart car 452, and other electronic devices. In embodiments, security module 110 transmits the commands over a Bluetooth connection.

Figure 5:
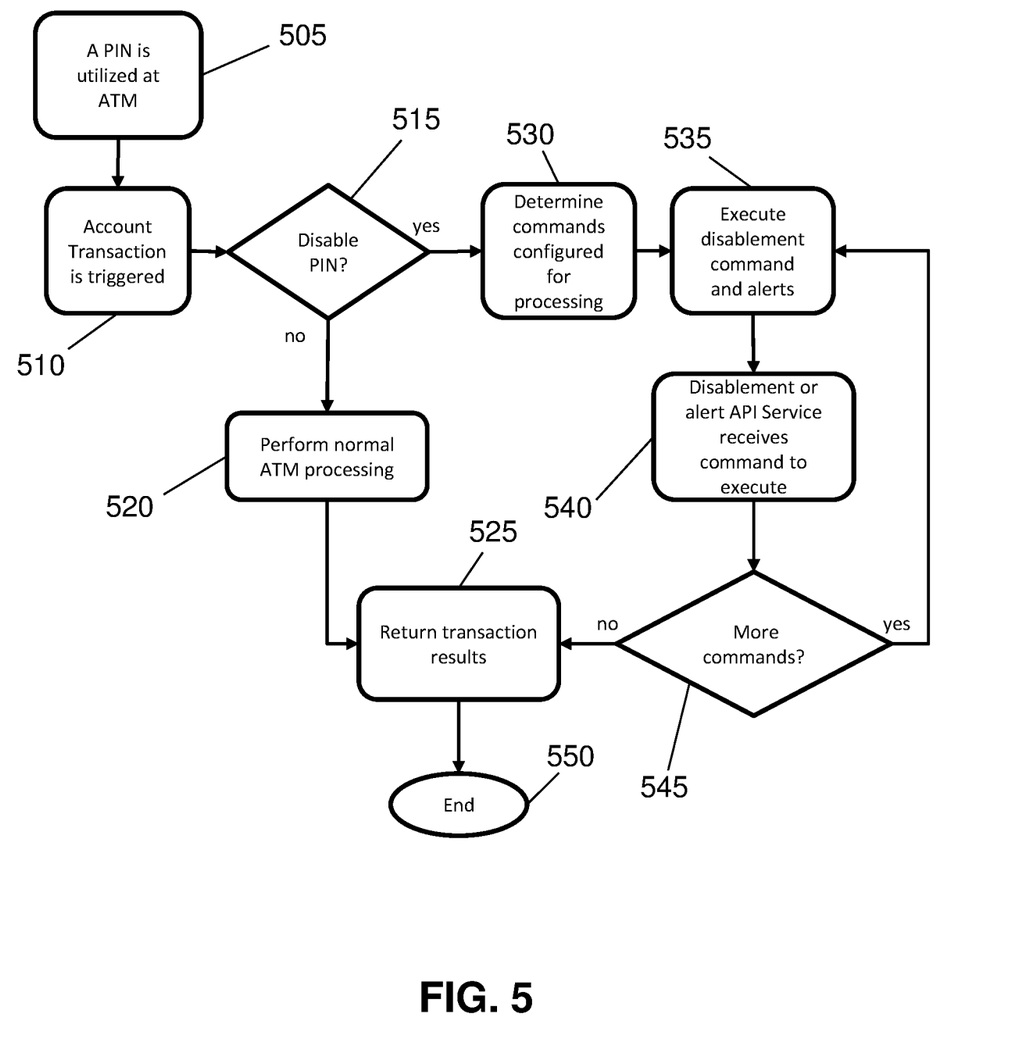
FIG. 5 shows a flowchart of an exemplary method in accordance with aspects of the invention.

FIG. 5 shows a flow chart of an exemplary method in accordance with aspects of the invention. Steps of the method may be carried out in the environment of FIG. 4 and are described with reference to elements depicted in FIG. 4.

At step 505, a PIN is utilized at an ATM, such as, for example, ATM 405 in FIG. 4. For example, a user gives a disablement PIN to an unauthorized user and the unauthorized user enters the disablement PIN (not realizing it is a disablement PIN) into the ATM (or into a smart phone for activation of the ATM).

At step 510, an account transaction is triggered by entry of the PIN at step 505. At step 515, security module 110, for example, determines whether the PIN entered at step 505 is an activation PIN or a disablement PIN. If, at step 515, security module 110 determines that the PIN entered at step 505 is an activation PIN, then processing proceeds to step 520 where the ATM, for example ATM 405, performs normal ATM processing. At step 525, security module 110 sends the results of the transaction to the ATM so that the ATM can display an appropriate message. In embodiments, as a result of an activation PIN being used, normal ATM transaction messages are displayed as a part of the normal ATM processing at step 520. After step 525, processing continues to step 550, where processing ends.

If, at 515, security module 110 determines that the PIN entered at 505 is a disablement PIN, then processing proceeds to step 530 where, for example, disablement command processor 160 in FIG. 4 determines what commands are to be configured for processing based on the disablement PIN received and the account associated with the disablement PIN. At step 535, disablement command processor 160 in FIG. 4, for example, executes the particular disablement commands and alerts associated with the disablement PIN and the account. At step 540, one disablement or alert API service such as, for example, services 440, 445, 450, 455 in FIG. 4, receives the command from, for example, disablement command processor 160. At step 545, security module 110 determines if more commands are to be executed. If at step 545, security module 110 determines that no more commands are to be executed, processing proceeds to step 525 where one or more messages are returned to the ATM for display. In embodiments, the messages returned to the ATM at step 525 include no messages that alert the unauthorized user that any disablements or alerts have been activated. In embodiments, the transaction, for example a cash withdrawal, is authorized and executed in an effort to not agitate the unauthorized user. If at step 545, security module 110 determines that more commands are to be executed, processing returns to step 535 and the process is repeated until all commands are executed.

Embodiments trigger a plurality of action on IoT devices based on the disablement PIN entered. Examples of actions include: disabling a device (such as, for example, a smart watch) so that it will not boot up until connected to an authorized device; encrypt data on a device; delete data on a device; completely shut down and immobilize ("brick") a device. In embodiments, the system (that is running on the ATM or on a cloud service connected to the ATM), sends a command to the device using any available method like Bluetooth, or by the use of an application loaded on the user IoT device.

Embodiments activate pervasive global positioning system (GPS) on a device, for example, a smart watch or smart phone, so that the device sends location information even when the device is turned off. Embodiments send alerts to one or more predetermined contacts including location and/or images from the ATM (still pictures or video feeds). Embodiments (that are running on the ATM or on a cloud service connected to the ATM), send the location of the ATM plus the images/videos to one or more persons registered by the user with the bank (or other institution holding the account) using one or more communication channels (applications, email, SMS, and or other communication channels).

Embodiments send a command to an autonomous or other vehicle API requesting to disable the vehicle or a portion of the vehicle (to prevent it from being stolen or used by the unauthorized user). In embodiments, the system executes a physical action if allowed by the vehicle hardware such as, for example, venting the air form the tires to make them flat.

In embodiments, the above described actions are modified based on the location of the ATM. For example, if in a particular geographic location, the system will never issue a command to make the tires flat, while in another geographic location, the system will encrypt, but not disable, all devices.

Figure 6:
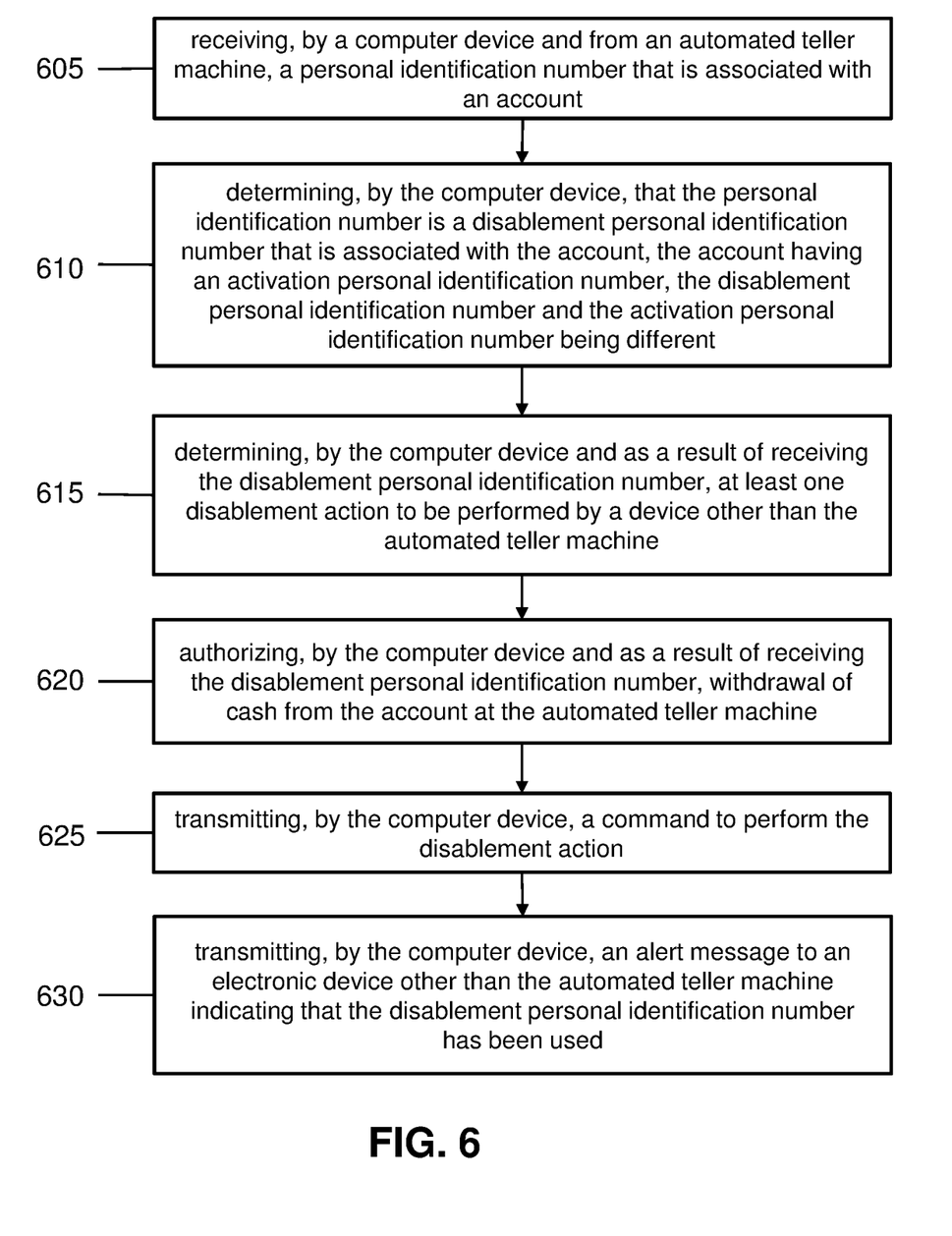
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system receives, by a computer device and from an automated teller machine, a personal identification number that is associated with an account. In embodiments, and as described with respect to FIG. 4, security module 110 receives from ATM 405 a personal identification number that is associated with an account.

At step 610, the system determines that the personal identification number is a disablement personal identification number that is associated with the account, the account having an activation personal identification number, the disablement personal identification number and the activation personal identification number being different. In embodiments, and as described with respect to FIG. 4, security module 110 determines that the personal identification number received from ATM 405 is a disablement personal identification number that is associated with the account by comparing it to account PIN database 430.

At step 615, the system determines, by the computer device and as a result of receiving the disablement personal identification number, at least one disablement action to be performed by a device other than the automated teller machine. In embodiments, and as described with respect to FIG. 4, security module 110 determines, as a result of receiving the disablement personal identification number from ATM 405, that disablement API service-smart phone 440 is to be performed on smart phone 442.

At step 620, the system authorizes, by the computer device and as a result of receiving the disablement personal identification number, withdrawal of cash from the account at the automated teller machine. In embodiments, and as described with respect to FIG. 4, security module 110 authorizes, as a result of receiving the disablement personal identification number from ATM 405, a withdrawal of cash from the account at ATM 405.

At step 625, the system transmits a command to perform the disablement action. In embodiments, and as described with respect to FIG. 4, security module 110 transmits a command to disablement API service-smart phone 440 to perform the disablement of smart phone 442.

At step 630, the system transmits an alert message to an electronic device other than the automated teller machine indicating that the disablement personal identification number has been used. In embodiments, and as described with respect to FIG. 4, security module 110 transmits an alert email to a computer through disablement alert service 455, the alert message indicating that the disablement personal identification number has been used.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device of a financial institution via an automated teller machine (ATM), a personal identification number that is associated with an account being accessed by an accessing device used during a cardless ATM operation with the ATM;
determining, by the computer device, that the personal identification number is a disablement personal identification number that is associated with the account, the account having an activation personal identification number, the disablement personal identification number and the activation personal identification number being different, the disablement personal identification number being configured to allow a user of the account to select a user device being disabled when the disablement personal identification number is received, wherein the user device is selected from a plurality of devices associated with the account that includes the accessing device;
accessing, by the computer device and as a result of receiving the disablement personal identification number, a disablement pin database to determine at least one disablement action, a disablement action modification, and an alert rule associated with the disablement personal identification number, the disablement action modification including modification to the at least one disablement action based on a geographic location of the ATM;
determining, by the computer device and based on the disablement pin database, the at least one disablement action to be performed by the user device, wherein the at least one disablement action includes at least one of disabling the user device by preventing use of the user device by an unauthorized user, encrypting data on the user device, deleting data on the user device, and immobilizing the user device;
transmitting, by the computer device, a command to a disablement application programming interface (API) service of the user device that performs the at least one disablement action, wherein the disablement API service of the user device executes the command that disables the user device;

transmitting, by the computer device, an alert message to another device of the plurality of devices indicating that the disablement personal identification number has been used; and activating, by the computer device, a pervasive global positioning system (GPS) on the accessing device used during the cardless ATM operation so that in response to the accessing device being turned off, the accessing device sends location information.

2. The method of claim 1, wherein the transmitting comprises transmitting the command over a wireless network.

3. The method of claim 1, wherein the account is a financial account.

4. The method of claim 1, wherein the activation personal identification number authorizes withdrawal of cash from the account at the ATM.

5. The method of claim 1, further comprising authorizing, by the computer device and as a result of receiving the disablement personal identification number, withdrawal of cash from the account at the ATM.

6. The method of claim 1, wherein the at least one disablement action is disablement of a smart phone used to access the ATM.

7. The method of claim 1, wherein the at least one disablement action is disablement of a smart watch.

8. The method of claim 1, wherein the at least one disablement action is deletion of data on the user device.

9. The method of claim 1, wherein the user device is an automobile that executes a physical action to disable the automobile.

10. The method of claim 1, wherein the at least one disablement action is a plurality of disablement actions.

11. The method of claim 10, further comprising receiving user input that defines the plurality of disablement actions, wherein the user input is a selection of the plurality of disablement actions from a list of available disablement actions associated with the disablement personal identification number and the account.

12. A computer program product comprising one or more computer readable storage media having program instructions collectively stored on the one or more computer readable storage media, when executed by a computer processor, causes the computer processor to:

receive, from an automated teller machine (ATM), a personal identification number that is associated with an account being accessed by an accessing device used in a cardless ATM operation with the ATM;

determine that the personal identification number is a disablement personal identification number that is associated with the account, the account having an activation personal identification number, the disablement personal identification number and the activation personal identification number being different, the disablement personal identification number being configured to allow a user of the account to select a user device being disabled when the disablement personal identification number is received, wherein the user device is selected from a plurality of devices associated with the user of the account, the plurality of devices being devices other than the accessing device;

access, as a result of receiving the disablement personal identification number, a disablement pin database to determine at least one disablement action, a disablement action modification, and an alert rule associated with the disablement personal identification number, the disablement action modification including modification to the at least one disablement action based on a geographic location of the ATM;

determine, based on the accessed disablement pin database, the at least one disablement action to be performed by the user device of the plurality of devices, wherein the at least one disablement action includes at least one of disabling the user device by preventing use of the user device by an unauthorized user, encrypting data on the user device, deleting data on the user device, and immobilizing the user device, and the user device is associated with a user of the disablement personal identification number;

transmit a command to a disablement application programming interface (API) service of the another device that performs the at least one disablement action, wherein the disablement API service of the user device executes the command that disables the user device;

transmit an alert message to another device of the plurality of devices indicating that the disablement personal identification number has been used; and activate a pervasive global positioning system (GPS) on the accessing device used during the cardless ATM operation so that in response to the accessing device being turned off, the accessing device sends location information.

13. The computer program product of claim 12, wherein the transmitting comprises transmitting the command over a wireless network.

14. The computer program product of claim 12, wherein the program instructions are further executable to authorize, as a result of receiving the disablement personal identification number, withdrawal of cash from the account at the ATM.

15. The computer program product of claim 12, wherein the at least one disablement action is disablement of a smart phone other than the accessing device used to access the ATM, and the determined at least one disablement action is based on the geographic location of the ATM.

16. A system comprising:

a processor, a computer readable memory, one or more computer readable storage media, and program instructions collectively stored on the one or more computer readable storage media, and when the program instructions are executed by the processor, causes the processor to:

receive, from an automated teller machine (ATM), a personal identification number that is associated with an account being accessed by an accessing device used during a cardless ATM operation with the ATM;

determine that the personal identification number is a disablement personal identification number that is associated with the account, the account having an activation personal identification number, the disablement personal identification number and the activation personal identification number being different, the disablement personal identification number being configured to allow a user of the account to select a user device being disabled when the disablement personal identification number is received, wherein the user device is selected from a plurality of devices associated with the user of the account that includes the accessing device;

access, as a result of receiving the disablement personal identification number, a disablement pin database to determine at least one disablement action, a disablement action modification, and an alert rule associated with the disablement personal identification number, the disablement action modification including modification to the at least one disablement action based on a geographic location of the ATM;

determine, based on the accessed disablement pin database, the at least one disablement action to be performed by the user device, wherein the at least one disablement action includes disabling the user device by preventing use of the user device by an unauthorized user by executing a physical action allowed by hardware of the user device;

transmit an alert message to another device of the plurality of devices indicating that the disablement personal identification number has been used and activation of a pervasive global positioning system (GPS) on the accessing device used during the cardless ATM operation so even when the accessing device is turned off, the accessing device sends location information; and transmit a command to a disablement application programming interface (API) service of the user device that performs the at least one disablement action, wherein the disablement API service of the user device executes the command that disables the user device.

17. The system of claim 16, wherein the transmitting comprises transmitting the command over a Bluetooth connection, the account includes a plurality of disablement personal identification numbers.

18. The system of claim 16, wherein the program instructions are further executable to authorize, as a result of receiving the disablement personal identification number, withdrawal of cash from the account at the ATM.

19. The system of claim 16, wherein the program instructions are further executable to transmit an alert message to an electronic device other than the ATM indicating that the disablement personal identification number has been used.

* * * * *